Sept. 1, 1964
J. J. TENNYSON
3,146,849
METHOD AND APPARATUS FOR ACOUSTICALLY
SILENCING HIGH VELOCITY GASES
Filed Oct. 20, 1959
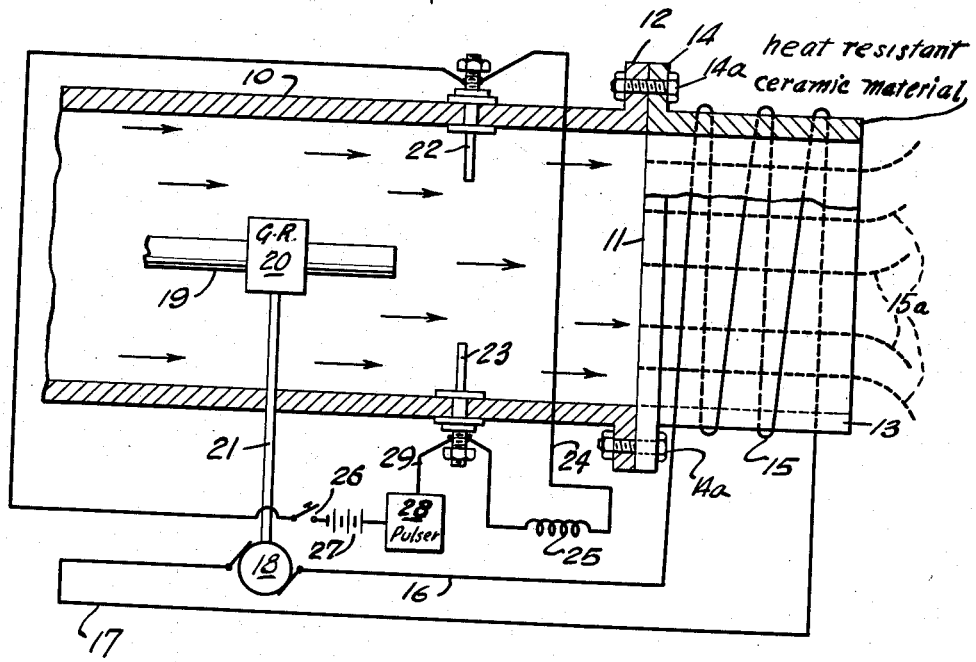
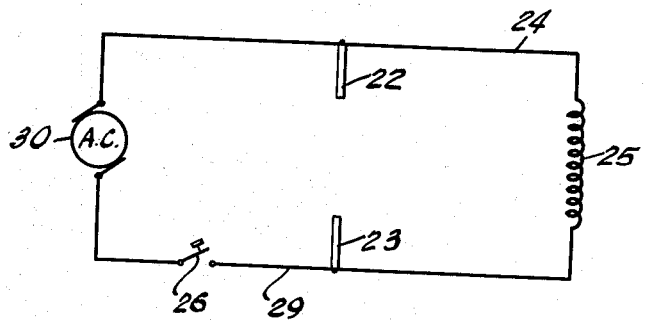
INVENTOR
JAMES JOSEPH TENNYSON
BY
Max A. Farmer
ATTORNEYS

United States Patent Office 3,146,849
Patented Sept. 1, 1964

3,146,849
METHOD AND APPARATUS FOR ACOUSTICALLY SILENCING HIGH VELOCITY GASES
James Joseph Tennyson, 32 Brill Ave., Waterford, Conn.
Filed Oct. 20, 1959, Ser. No. 847,667
11 Claims. (Cl. 181—35)
(Granted under Title 35, U.S. Code (1952), sec. 266)

The invention described herein may be manufactured and used by or for the Government of the United States of America for governmental purposes without the payment of any royalties thereon or therefor.

This invention relates to the acoustic silencing of ionized, high velocity gases, such as the exhaust gases from internal combustion engines. The purpose is to reduce the amount of the acoustic noise accompanying the exhaust or discharge of turbulent exhaust gases, when these gases contain ionized particles. It is particularly useful in reducing the acoustic noise of the exhausts from aircraft jet engines and rocket exhaust gases, which has long been a serious problem, but the principles employed for such use are applicable whenever the amount of ionization is or can be made sufficiently great to permit control of the turbulence by a magnetic field.

Heretofore attempts to silence turbulent exhaust gases have employed mechanical means along the exhaust passage, as in automobile mufflers, or by flutes in the tail of a jet aircraft engine, but the degree of silencing so obtained was at the expense of propulsive power.

An object of this invention is to provide an improved method and means for acoustically silencing turbulent ionized or ionizable exhaust gases that are discharged at a high velocity, with a minimum of loss of propulsive power in the case of engines, which will effectively silence such exhaust gases for a minimum cost and without an objectionable increase in the space occupied and in the weight of the silencing means employed, which will be relatively simple, practical and inexpensive, and which will employ compact and relatively simple apparatus.

Other objects and advantages will appear from the following description of embodiments and examples of the invention, and the novel features will be particularly pointed out hereinafter in connection with the appended claims.

In the accompanying drawing:

FIG. 1 is a schematic diagram of apparatus, in longitudinal section, employed in one example of the invention; and FIG. 2 is a wiring diagram of a modified means for electrically ionizing some of the exhaust gases before the turbulence of those gases is magnetically reduced in accordance with this invention.

In the example of the invention illustrated in FIG. 1, the high velocity, turbulent exhaust gases from an engine are delivered through an exhaust conduit 10 having an open discharge end 11. An external peripheral flange 12 on the conduit surrounds the open end 11. A sleeve 13 of heat resistant material, such as of heat resistant, pyroceramic material, for example of the same size as the open end 11 is disposed in alignment with and abutting the open end 11 so as to form a continuation or elongation of the conduit 10. The sleeve 13 may have on one end a peripheral, external flange 14 that abuts against or is disposed near and aligned with the flange 12, and the flanges 12 and 14 are detachably coupled together in any suitable manner such as by screws 14a passing between the flanges. The inside diameter of the sleeve 13 is preferably at least as large in cross sectional area as that of the conduit 10.

A solenoid winding 15 is mounted on the exterior of sleeve 13, concentrically therewith, with the axis of the winding approximately coincident with the axis of the passage through the sleeve 13. The winding has thermally insulated wires 16 and 17 leading to the ends of the winding and by which a D.C. current may be passed through the solenoid winding to energize it and set up a magnetic field whose axis is in the passage of the sleeve 13, preferably centrally thereof. The D.C. current may be obtained from a D.C. generator 18 to which wires 16 and 17 are connected, and the generator is operated in any desired manner. In some jet engines there is a rotatably mounted compressor shaft 19 in the conduit 10, which is rotatable about its longitudinal axis during operation of the engine, and this shaft 19 operates, through a gear reduction device 20, a rotatably mounted shaft 21 that extends to the exterior of the conduit 10 and there operates the generator 18. This is merely one manner of operation of the generator 18, and any other means for operating it may be employed.

When the internal combustion engine (not shown) is operating, its exhaust gases will be discharged at high velocity through the conduit 10 and the sleeve 13. Some of the particles of the exhaust gases are usually ionized, and with the D.C. generator 18 operating at the same time, the ionized particles, in passing through the magnetic field created by the solenoid winding 15, will be altered in their paths to travel in the direction of the field. The ionized particles in the turbulent parts of the exhaust gases will be caused by the magnetic field to travel in approximately straight lines through the field, which materially reduces the turbulence of the ionized particles and hence reduces the noise of the exhaust gases. The noise in exhaust gases is usually caused by turbulence of those gases, and by reducing such turbulence one materially reduces the noise.

As the ionized particles of the exhaust gases leave the magnetic field, the lines of force of the magnetic field will separate or spread, as shown by the dash lines 15a in FIG. 1, in turning to return to the opposite end of the winding and the spreading of the lines of force will tend to spread or expand the exhaust gases leaving sleeve 13, which reduces the velocity of the expanding gases and hence further reduces noise. For a given minimum amount of ionization in the exhaust gases, the degree of silencing will be dependent upon the magnitudes of the magnetic field and the length of the coil or winding 15 through which the exhaust gases pass.

To increase the silencing in accordance with this invention, the ionization of the gas particles may be increased. One way is to add to the engine fuel or to the jet stream, any contaminant which will increase the ionization present in the exhaust. For example, one may add alkaline salts, such as the sodium salts, to the fuel or to the jet stream, and they will increase the ionization present in the exhaust gases and thus reduce the amount of the magnetic field required to obtain a given degree of reduction in turbulence in the discharged exhaust gases.

Another way is illustrated in FIG. 1 in which increased ionization in the exhaust gases is obtained electrically. In this example, a pair of metal probes 22 and 23 are disposed within the passage of the conduit 10, in spaced relation to one another, and before the discharge end thereof. These probes are insulated in any suitable manner from the wall of conduit 10 and from each other. One of the probes, such as 22, is connected by a wire 24 to one end of an inductance winding 25, and also through a manually operable switch 26 to a source 27 of D.C. current, shown conventionally as a battery but which may be, and preferably is, a D.C. generator. The other side of the source 27 is connected through a pulser 28 and by wire 29 to the other probe 23 and then to the other side of induction winding 25. The pulser may be a thermally operated flasher switch, or any other means to pulse the current passing through coil or winding 25. The high voltages created between the probes within the passage of conduit 10, will ionize the exhaust gases between them. A modification of the means for electrically ionizing the exhaust gases is illustrated in FIG. 2 in which an A.C. generator 30 is substituted for the D.C. source 27 and pulser 28 of FIG. 1, the other parts of the circuit being the same as in FIG. 1 and given corresponding reference numerals.

The size of the D.C. generator 18 that supplies the solenoid winding 15 with current, is one which will provide a magnetic field in the winding 15 of approximately $3 \times 10^3$ oersteds, which in a practical installation would require approximately 100 to 200 kilowatts or 1 to 2 percent of the thrust capability of a 10,000 pound thrust engine.

In operation, the flow of the turbulent ionized exhaust gases in any direction except parallel to the lines of the magnetic intensity is subjected to a force which will cause any ionized particles crossing the magnetic field to spiral around the magnetic lines, thus resisting the circulation of the gas flow and therefore reducing the amount of turbulence of the exhaust gases in the region of the solenoid winding. As the ionized gases leave the region of the solenoid winding, the fringe effects of the curving magnetic lines of the magnetic field move or spread away from the axis of the solenoid winding. The moving ionized gases, in traversing the fringe effects of the magnetic field, that is the diverging magnetic lines, experience a force which encourages diffusion of the gases away from the axis of the discharged gases, which diffusion reduces turbulence and noise of the gases. The effect of the magnetic fringe is to reduce the velocity flow, but this is of lesser import. Thus by reducing turbulence and thereby causing the axial flow to be greater the power expended to obtain acoustic silencing will be partially compensated for by an increase in aircraft thrust force. The reduction in acoustic noise intensity caused by the magnetic field will be proportional to the decrease in turbulence and to the increase in the diffusion of the outward flow of the exhaust gases.

The sleeve 13 and the solenoid winding 15 may, if desired, be mounted on a movable carriage (not shown) that can contain an A.C. motor (not shown) to drive the D.C. generator 18, or A.C. power to operate a motor (not shown) that drives the generator 18 may be taken from a convenient ground source. The sleeve 13 in such cases is supported on vertically adjustable legs (not shown) so that its height may be adjusted to the height of the tail pipe or conduit 10 of a grounded aircraft and the sleeve 13 aligned with such tail pipe or conduit. Thus, such a portable silencing means may be used as a silencer on many aircraft (not shown) while the aircraft are grounded but with their engines operating, or while a vehicle carrying an engine is stationary, such as when an aircraft is standing and warming up. A jet engine may be tested under its rated power when using this silencer where the power for the solenoid winding is obtained from a source separate from the engine. Where the source or cost of A.C. power (.05 to .1 of stream horsepower) is not a problem, the movable solenoid 15 can be used to provide increased silencing in physically small or restricted areas such as aboard aircraft carriers (not shown).

While the magnetic field of the solenoid winding is preferably axial to the direction of flow of the exhaust gases, it may, if desired, be caused to be transverse to the direction of flow (not shown) of the discharged exhaust gases, and in that event the transverse magnetic field will exert a considerably greater inhibiting effect upon turbulence of the gases, and hence reduce the acoustic noise more than when the magnetic field was axial to the direction of flow of the discharged gases. However, this increased silencing effect, when using the magnetic field transverse to the direction of flow of the exhaust gases, impedes the flow of the gases, and hence will be accomplished at the expense of the reduced velocity of the discharged gases. This transverse field increases the ionization of the gases due to bunching which also enhances flow impedance and reduces turbulence. This transverse magnetic field may also be used to exercise an additional degree of control of thrust, if desired, by varying the intensity of the magnetic field, and therefore the velocity of the outward gaseous flow.

In the example illustrated, the amount of decrease of turbulence is dependent upon making the magnetic viscous force per unit volume larger than the ordinary viscous forces in the medium. Quantities which describe a measure of these effects are the Q factor of S. Chandrasekhar ("The Stability of Viscous Flow Between Rotating Cylinders in the Presence of a Magnetic Field," Proceedings of the Royal Society 1952, 1953, pp. 215–216; and "The Inhibition of Convection by a Magnetic Field," Philosophical Magazine, Vol. 43, 1952) and the q' factor of J. T. Stuart ("On the Stability of Viscous Flow Between Parallel Planes in the Presence of a Coplanar Magnetic Field," Proceedings of the Royal Society, Series A, Vol. 221, 1954).

The Q factor of Chandrasekhar is defined as follows:

$$Q = \frac{\mu^2 H^2 d^2 \sigma}{\rho V}$$

where in the c.g.s. electromagnetic system of units $\mu$ = permeability
$H$ = magnetic intensity (Gauss)
$d$ = separation
$\sigma$ = conductivity
$\rho$ = density
$V$ = kinematic viscosity The $q'$ factor of Stuart is of the form of the Q of Chandrasekhar divided by the Reynolds number or $$q' = \frac{Q}{R} = \frac{\frac{\mu^2 H^2 d^2 \sigma}{\rho v}}{\frac{V_0 d}{V}} = \frac{\mu^2 H^2 \sigma d}{\rho V_0}$$

where the additional quantity $V_0$ is the velocity of flow of the medium.

The conductivity of the medium is determined primarily by the number of electrons per unit volume of the ionized gas (Lyman Spitzer, The Physics of Fully Ionized Gases, published 1956 by Interscience Publishers of New York, N.Y.). In order to cause the magnetic effects to exceed the viscous effects for fixed dimensions and fluids, the primary controls are the magnetic intensity and the amount by which the conductivity may be increased by adding contaminants such as sodium salts.

The degree of control on efficiency of the system increases with altitude of use or with decrease in density of medium, and so at high altitudes where silencing may not be required, the use of the principle will provide a greater axial gas flow by reducing the turbulence, and consequently increased thrust for the vehicle.

It will be understood that various changes in the steps, details, materials, and arrangements of parts, which have been herein described and illustrated in order to explain the nature of the invention, may be made by those skilled in the art within the principle and scope of the invention, as expressed in the appended claims.

I claim:

1. The method of acoustically silencing a stream of ionized gases being discharged from an open end of a conduit, which comprises increasing the ionization of said gases and then passing said stream, with increased ionization of its particles, before it materially expands in cross sectional area, through a continuous magnetic field in close proximity to said end of said conduit in a direction substantially parallel to the magnetic axis of said field, whereby movement of the ionized particles in said stream in directions crosswise of the direction of travel of the discharged stream will be altered and such particles biased to travel in a direction parallel to the direction of travel of the stream, whereby turbulence in said stream as discharged will be reduced to a minimum.

2. A device for acoustically silencing a stream of gases being discharged at a high velocity, which comprises:
  (a) a conduit through which said gases pass to a terminal end thereof from which the gases are discharged, and having in spaced apart succession along it,
  (b) means for increasing the ionization of the gases, and
  (c) means disposed around the terminal portion of the passage of the conduit, for creating a magnetic field with its axis approximately parallel to the direction of travel of the gases and through which all of the gases pass before discharge from said conduit,
  (d) said ionizing means being disposed at least largely in advance of said field creating means and operable on said gases substantially entirely before the gases reach said magnetic field created by said second means.

3. A device for acoustically silencing a stream of ionized gases being discharged at a high velocity which comprises:
  (a) a conduit through which said gases are conducted and from a terminal end of which they are discharged as a stream,
  (b) means surrounding the passage of said conduit adjoining its said terminal end for creating within such passage a magnetic field whose axis is approximately parallel to the direction of travel of said gases, and
  (c) means disposed along said conduit passage, at least largely in advance of said magnetic field, for increasing the ionization of said gases before they reach said magnetic field.

4. The device according to claim 3, wherein the means for increasing the ionization of the exhaust gases is means for adding contaminants to the exhaust gases before they reach said magnetic field.

5. A device for acoustically silencing a stream of ionized gases being discharged at a high velocity which comprises:
  (a) a conduit through which said gases are conducted and from a terminal end of which they are discharged as a stream,
  (b) means surrounding the passage of said conduit adjoining its said terminal end for creating within such passage a magnetic field whose axis is approximately parallel to the direction of travel of said gases,
  (c) electrodes disposed at approximately opposite sides of said conduit in advance of said means surrounding said conduit passage, and
  (d) means for applying a varying voltage across said electrodes for increasing the ionization of said gases before they reach said magnetic field.

6. The device according to claim 5, wherein said varying voltage is a pulsating D.C. voltage.

7. The device according to claim 5, wherein said varying voltage is an A.C. voltage, 8. A device for acoustically silencing a stream of exhaust gases from rockets and jet engines and the like, which comprises:
  (a) a conduit with a passage through which said gases may pass to a terminal end thereof, from which the gases are discharged,
  (b) a coil surrounding the conduit passage adjacent said terminal end with its axis generally parallel to the axis of the conduit passage which it surrounds,
  (c) means operated by the passage of exhaust gases along said conduit passage for passing a direct current through said coil and creating a magnetic field in said passage, and
  (d) means disposed along said conduit in advance of any of said coil for increasing the ionization of the gases passing along said conduit to said terminal end before they reach said magnetic field.

9. A device for acoustically silencing a stream of exhaust gases from rockets and jet engines and the like, which comprises:
  (a) a conduit with a passage through which said gases may pass to a terminal end thereof, from which the gases are discharged,
  (b) a coil surrounding the conduit passage adjacent said terminal end with its axis generally parallel to the axis of the conduit passage which it surrounds,
  (c) means operated by the passage of exhaust gases along said conduit passage for passing a direct current through said coil and creating a magnetic field in said passage,
  (d) probes disposed in said conduit passage, in advance of said coil, at opposite sides of said passage, and
  (e) means for repeatedly applying a varying voltage between said probes to increase the ionization of the exhaust gases before they materially enter the magnetic field created by said coil.

10. The device according to claim 9, and an inductance connected across said probes.

11. A device for acoustically silencing a stream of exhaust gases from rockets, jet engines and the like, which comprises:
  (a) a conduit having a passage through which said gases may pass from an entrance end to a discharge end,
  (b) means for increasing the ionization of said gases moving in one portion of said passage, and
  (c) means for creating a magnetic field in said passage in another and separate portion thereof spaced from said ionization increasing means further along such passage in the direction of flow of said gases.

References Cited in the file of this patent

UNITED STATES PATENTS

| | | |
|---|---|---|
| 2,726,805 | Lawrence et al. | Dec. 13, 1955 |
| 2,755,014 | Westendorp et al. | July 17, 1956 |
| 2,763,125 | Kadosch et al. | Sept. 18, 1956 |
| 2,765,975 | Lindenblad | Oct. 9, 1956 |
| 2,783,008 | Bodine | Feb. 26, 1957 |
| 2,858,972 | Gurewitsch | Nov. 4, 1958 |
| 2,992,345 | Hansen | July 11, 1961 |
| 3,041,824 | Berhman | July 3, 1962 |

OTHER REFERENCES

Popular Science, publication, October 1956, pages 126 and 127.

W. E. Moeckel, "Propulsion Methods in Astronautics," Advances in Aeronautical Sciences, Proceedings of the First International Congress in the Aeronautical Sciences, Madrid Sept. 8–13, 1958, vol 2, (New York; Pergamon Press, 1959) Pages 1088–1093.